(No Model.)
E. J. HOWE.
EGG OR CAKE BEATER.
No. 592,708. Patented Oct. 26, 1897.
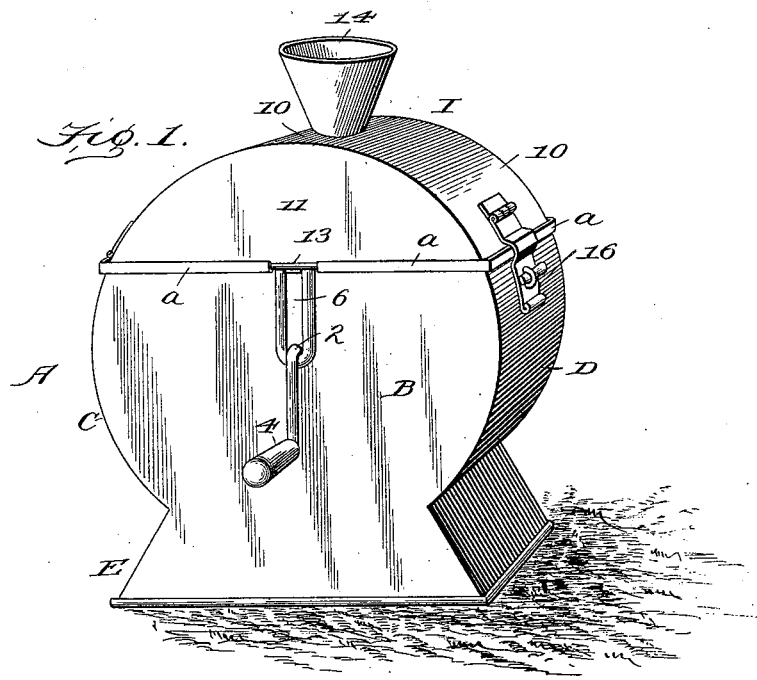
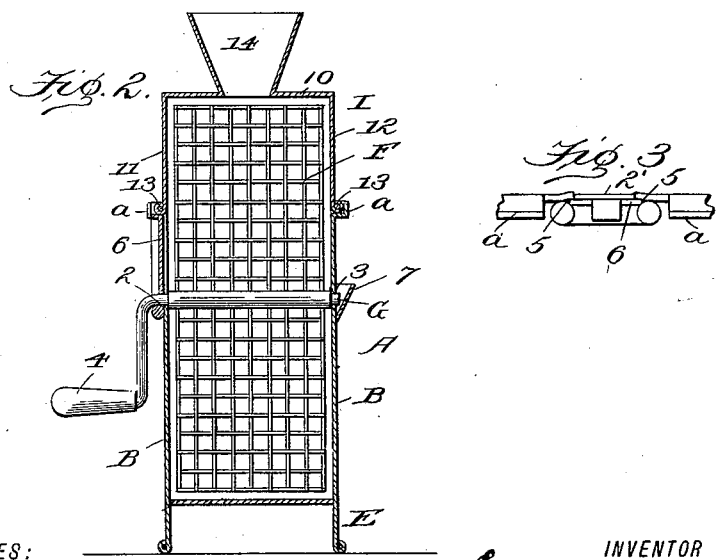
WITNESSES:
A. B. Lacey
Ralph Normelle
INVENTOR
Emma Jane Howe
BY
R. S. & A. P. Lacey
ATTORNEYS

UNITED STATES PATENT OFFICE.

EMMA JANE HOWE, OF WEST SUPERIOR, WISCONSIN.

EGG OR CAKE BEATER.

SPECIFICATION forming part of Letters Patent No. 592,708, dated October 26, 1897.

Application filed August 27, 1896. Serial No. 604,097. (No model.)

*To all whom it may concern:*

Be it known that I, EMMA JANE HOWE, a citizen of the United States, and a resident of West Superior, in the county of Douglas and State of Wisconsin, have invented certain new and useful Improvements in Egg or Cake Beaters; and I do hereby declare the following to be a full, clear, and exact description of the invention, such as will enable others skilled in the art to which it appertains to make and use the same, reference being had to the accompanying drawings, forming a part of this specification.

My invention relates to certain new and useful improvements in egg or cake beaters; and the object is to produce a simple, cheap, and convenient as well as effective and durable device of this class for household use.

To these ends the novelty consists in the construction, combination, and arrangement of the several parts of the same, as will be hereinafter more fully described, and particularly pointed out in the claim.

In the accompanying drawings the same reference-characters indicate the same parts of the invention.

Figure 1 is a perspective view of my improved egg and cake beater. Fig. 2 is a transverse vertical central section of the same, and Fig. 3 is a detail plan view of the manner of securing one end of the operating-shaft in place.

A represents a sheet-metal casing comprising the vertical parallel sides B B, approximately disk shape, and C D are the end walls, curved to correspond to the shape of the edges of the parallel sides, the sides and ends terminating in a supporting-flange E.

A horizontal flange $a$ extends entirely around the upper edges of the sides and tends to form a seat for the beaded edge 13 of the hinged top 10, which is provided with the usual hasp for securing the cover in position when the machine is in operation.

14 represents the usual funnel or hopper communicating with the interior of the machine.

5 represents a U-shaped wire yoke, the lower semicircular end of which forms a bearing for one end of the crank-shaft I, the opposite end G of which is journaled in an orifice 3 in the opposite side, and this orifice is protected by a hood 7.

2 represents a slide the parallel edges of which fit snugly in the recesses formed by the wire yoke, and the contiguous sides of the edges on each of the vertical openings or slots between the arms of the yoke and the lip 2′, which also forms the handle of said slide, are turned outwardly, so as to rest under the beaded edge of the cover 10 and prevent its accidental misplacement when the machine is in operation.

The crank-shaft I is provided with the usual handle for operating it, and F represents the integral flexible recticulated blade, centrally mounted on said shaft and revolving with it. This recticulated blade F is rectangular in form and snugly conforms to the diameter and width of the case A.

The operation of the device is very simple and it is believed will be readily understood without further description.

Having thus fully described my invention, what I claim as new, and desire to secure by Letters Patent of the United States, is—

A combined egg and cake beater comprising the approximately circular casing A having parallel sides B B terminating in integral supporting-flanges E E, and having its upper rectangular edge formed with an angular seat-flange $a$, the hinged top 10 formed with a beaded edge 13 and provided with the conical funnel 14, the wire yoke 5, the vertical slide 2, removably secured in said yoke, and the bearing-orifice 3 formed in the opposite side of said casing and protected by the open-top hood 7, in combination with the shaft I provided with the crank-handle 4 and the integral, flexible, recticulated blade F centrally mounted on said shaft I, substantially as shown and described.

In testimony whereof I affix my signature in the presence of two witnesses.

EMMA JANE HOWE.

Witnesses:
W. M. GRAHAM,
FRANK E. EVANS.